May 24, 1966 J. O. SARTO 3,252,451
DISTRIBUTOR VACUUM ADVANCE VALVE
Filed Oct. 23, 1963 2 Sheets-Sheet 1
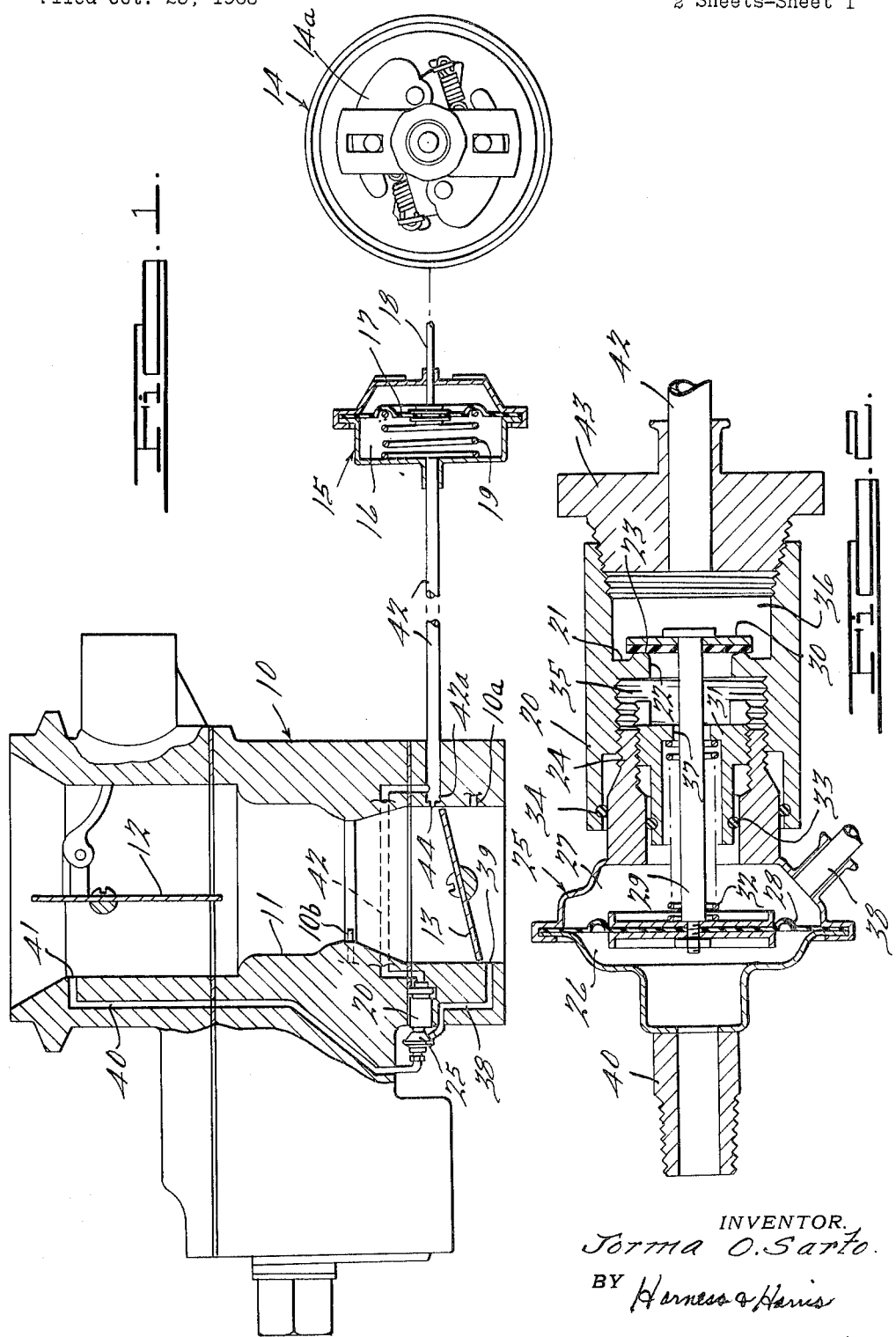
INVENTOR.
Jorma O. Sarto
BY Harness & Harris
ATTORNEYS.

May 24, 1966 J. O. SARTO 3,252,451
DISTRIBUTOR VACUUM ADVANCE VALVE
Filed Oct. 23, 1963 2 Sheets-Sheet 2

INVENTOR.
Jorma O. Sarto.
BY
ATTORNEYS.

United States Patent Office 3,252,451
Patented May 24, 1966

3,252,451
DISTRIBUTOR VACUUM ADVANCE VALVE
Jorma O. Sarto, Orchard Lake, Mich., assignor to Chrysler Corporation, Highland Park, Mich., a corporation of Delaware
Filed Oct. 23, 1963, Ser. No. 318,285
13 Claims. (Cl. 123—117)

This invention relates to improvement in carburetion for vehicle internal combustion engine and in particular to simple means responsive to the pressure in the fuel-air inlet induction conduit or manifold for advancing the engine ignition spark distributor during deceleration or coasting and for retarding the ignition distributor during normal engine idling so as to achieve improved combustion and to minimize the exhausting of unburned hydrocarbons.

It has been common heretofore to advance and retard the ignition distributor in accordance with engine speed and manifold pressure. For example it has been customary during engine idling to advance the distributor to fire when the engine piston is approximately 10° of crank shaft rotation in advance of its top-most or dead-center position and thereafter to progressively advance the distributor with increasing engine speed. Operation under such conditions results in optimum fuel economy but requires a fuel-air ratio during engine idling appreciably greater than the stoichiometric ratio of approximately .067 pound of fuel per pound of air which supplies the minimum air required for complete combustion of the fuel. Furthermore, during engine coasting above approximately 25 miles per hour, the inlet manifold vacuum rises to between 22 and 25 inches of mercury (i.e., the absolute pressure falls) at which low pressures under conventional operating conditions, failure of engine combustion usually occurs and large amounts of unburned hydrocarbons are exhausted to the atmosphere.

It has been found that if the ignition spark distributor is retarded to fire when the piston is approximately 5 to 15 degrees of crankshaft rotation beyond its top or dead-center position, the engine can be idled with an appreciably leaner fuel-air mixture approximating the stoichiometric ratio, provided that the fuel consumption is increased slightly above the customary idling value for optimum fuel economy. In consequence, the exhausting of unburned hydrocarbons is materially reduced. For example, an engine that would customarily idle at a fuel-air ratio of .087 pound of fuel per pound of air and an air consumption of 35 pounds per hour can be operated to effect almost complete fuel combustion at a fuel-air ratio of .070 pound of fuel per pound of air and an air consumption of 54 pounds per hour merely by retarding the spark at idle to fire at 5° of crankshaft rotation after the dead-center position, rather than at the customary 10° in advance of the dead-center position.

In addition, by retarding the spark and increasing the fuel consumption as above, the engine can be operated without combustion failure at a manifold vacuum in excess of 22 inches of mercury. Accordingly slow speed coasting, as for example in city traffic with the throttle closed to the idle condition, does not appreciably increase the unburned hydrocarbon content of the exhaust. At higher coasting speeds, as for example in excess of approximately 25 miles per hour at the idle throttle position, it is preferred to advance the ignition spark as the manifold vacuum increases in order to obtain substantially complete combustion of the fuel.

An important object of the present invention is to provide improved means for advancing or retarding the ignition spark in response to manifold intake pressure, so as to retard the spark during idling and low speed coasting and to advance the spark rapidly when the coasting speeds exceed a predetermined value, as for example 25 miles per hour, or when the induction conduit vacuum rises above the idling value of approximately 19 or 20 inches of mercury.

Another object is to provide means which can be readily adapted to add a limited quantity of additional air to the fuel-air mixture as the manifold vacuum increases, or which can be readily adapted to prevent dilution of the fuel-air mixture as the manifold vacuum increases.

Other objects of this invention will appear in the following description and appended claims, reference being had to the accompanying drawings forming a part of this specification wherein like reference characters designate corresponding parts in the several views.

FIGURE 1 is a schematic view showing a carburetor in section and embodying an ignition spark control mechanism operatively connected with an ignition spark distributor.

FIGURE 2 is an enlarged longitudinal mid-sectional view through the valve mechanism responsive to the induction pressure.

Figure 3:
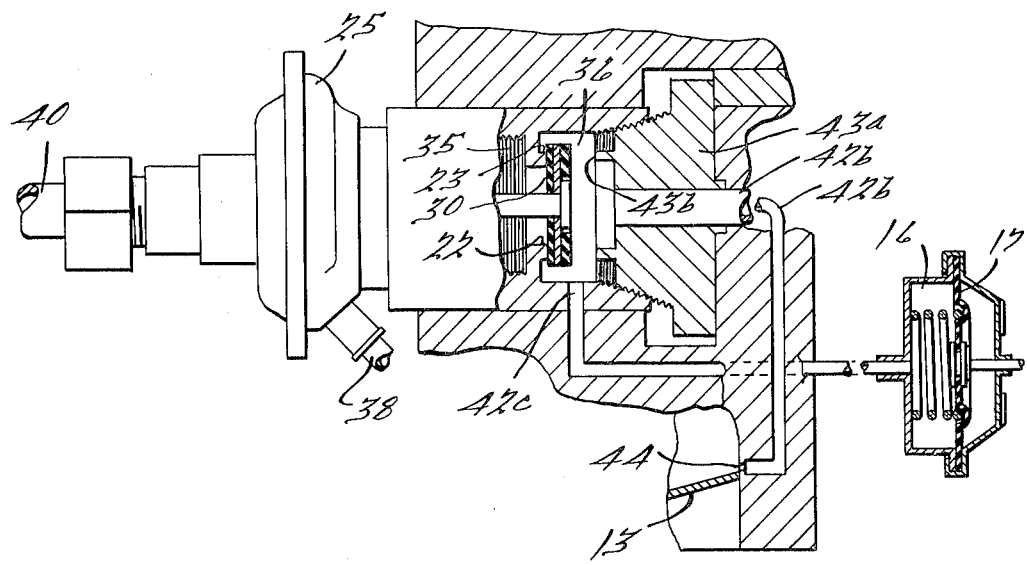
FIGURE 3 is a view similar to FIGURE 2, illustrating a modification of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to FIGURES 1 and 2, a particular embodiment of the present invention is illustrated by way of example with a carburetor 10 having a typical air inlet induction manifold or conduit 11, choke valve 12, and throttle valve 13. This structure may be conventional and will also embody the necessary idle fuel duct 10a and primary fuel duct 10b for admitting fuel to the induction conduit 11 during idle and load conditions of the engine for which the carburetor is provided.

Also associated with the engine is a conventional spark distributor 14 operatively connected with a distributor advancing and retarding mechanism which includes the customary flyweight type speed responsive governor mechanism 14a for advancing the ignition with increasing speed and also includes a pressure responsive means indicated generally by the numeral 15 and comprising a pressure chamber 16 defined in part by a movable wall or flexible diaphragm 17. The latter is connected with a reciprocal plunger 18 which in turn is operatively connected with the distributor 14 to advance or retard the timing of the engine spark or firing in cooperation with the governor mechanism 14a in accordance with leftward or rightward movement respectively of diaphragm 17 and plunger 18 in FIGURE 1.

A biasing spring 19 normally maintains the distributor in a retarded condition to cause spark or firing in the cylinder concerned at between approximately 5 to 15 degrees of crankshaft rotation after the engine piston has passed its top or dead-center position when the engine is idling normally. In this regard, with the ignition spark retarded as aforesaid, the carburetor is adjusted to supply fuel at an accelerated rate with respect to customary engine idling but at an appreciably leaner fuel-air mixture approximating the stoichiometric ratio of about .070 pound of fuel per pound of air. During engine idling and also during coasting of the engine, the throttle valve 13 is substantially closed and the pressure in conduit 11 downstream of throttle valve 13 is low. When the engine is coasting at speed greater than 25 miles per hour, the vacuum downstream of throttle valve 13 will frequently rise to between 22 and 25 inches of mercury.

In order to advance the ignition spark in response to an increased vacuum downstream of throttle valve 13 during deceleration or coasting, a valve is provided having a tubular housing with an intermediate inwardly directed annular restriction 21 around a port or opening 22. The restriction 21 terminates in an annular valve seat 23 coaxial with opening 22 and tubular housing 20. An internally threaded portion of the housing 20 screws on an externally threaded portion 24 of the housing 25 of a pressure actuated device partitioned into two chambers 26 and 27 by means of a movable wall or flexible diaphragm 28. The latter is secured around its periphery to the housing 25 and is secured centrally to a reciprocal shaft 29 to actuate the latter in accordance with the pressure differential across diaphragm 28.

The shaft or plunger 29 extends coaxially into housing 20 and through opening 22 and is secured at its right end to a suitable valve member or disc 30 adapted to seat at the annular valve seat 23 and close opening 22. A tubular spring retainer 31 arranged coaxially around plunger 29 screws into an internally threaded portion of extension 24 and provides an abutment for one end of a spring 32 coiled around shaft 29 and seated at its other end against a rigid portion of diaphragm 28 to urge the latter leftward in FIGURE 2, thereby to maintain valve 30 in its closed position seated against seat 23. Suitable annular seals 33 and 34 are provided between extension 24 and retainer 31 and housing 20 respectively to maintain a leak-proof enclosure for chamber 27.

The extension 21 in cooperation with valve 30 serves to partition housing 20 into two chambers 35 and 36, the chamber 35 being in continuous unrestricted communication with chamber 27 via central bore 37 in retainer 31 through which shaft 29 extends. The chambers 35 and 36 are in communication with each other when valve 30 is shifted rightward to its open position.

Chamber 27 is also maintained in unrestricted communication with conduit 11 by means of conduit 38 which opens into conduit 11 at port 39 downstream of throttle valve 13 when the latter is in its closed position, FIGURE 1. It is to be noted that port 39 is proximate the edge of valve 13 that swings downwardly upon opening of that valve, so that upon opening of the throttle valve 13, port 39 will be in the high pressure air stream upstream of valves 13 and will thus be rendered in effectual to cause opening of valve 30 as described below. Chamber 26 is maintained in unrestricted communication with atmospheric air by duct 40 which opens into conduit 11 at port 41 upstream of choke valve 12. Chamber 36 is maintained in unrestricted communication with chamber 16 by means of conduit 42, whereby diaphragm 17 is actuated in response to the pressure in chamber 36.

As illustrated in FIGURE 2, the left end of duct 42 is connected to chamber 36 by means of a tapered screw threaded fitting 43 which suitably seals the chamber 36. A restricted bleed port 44 opens into induction conduit 11 at a location adjacent to and upstream of throttle valve 13 when the latter is in its closed position and is in communication with conduit 42 and therefore with chamber 36 by means of a duct extension 42a. Thus the substantially atmospheric pressure in conduit 11 upstream of valve 13 when the latter is closed is communicated to chambers 36 and 16 during equilibrium operation conditions of the engine. In the above regard, port 44 serves as the conventional distributor vacuum advance port for engine operation under cruising conditions when throttle valve is partially open.

Figure 4:
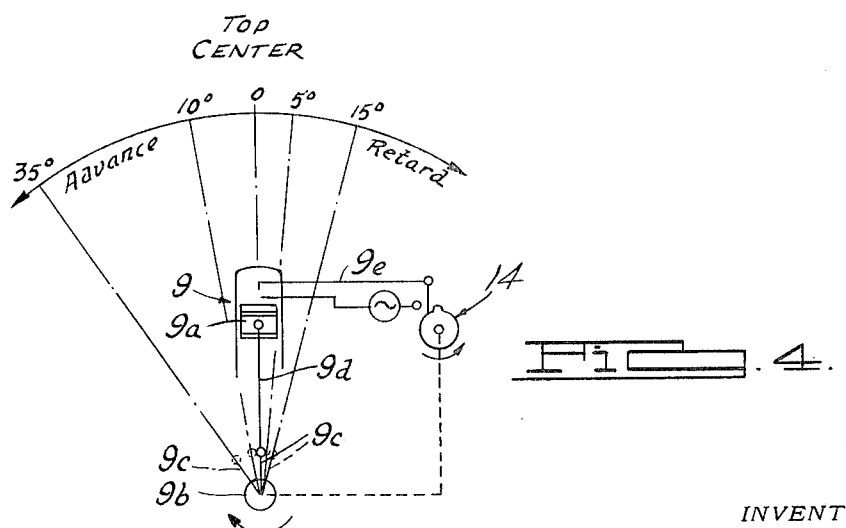
FIGURE 4 is a diagrammatic view showing the relationship between the piston and crankshaft of the vehicle engine at various advanced and retarded positions of the ignition spark distributor.

The vacuum advance port 44 is conventionally employed in cooperation with the speed responsive mechanism 14a for advancing the ignition spark with increasing speed until at about 30 m.p.h., the ignition spark or firing will occur at a predetermined angle of crankshaft rotation amounting to about 35° in advance of the top center position of the engine piston involved. Thus combustion in the engine cylinder will occur when the engine piston is adjacent its topmost position whereat optimum compression of the fuel-air mixture in the engine cylinder occurs, i.e. when the density of the fuel-air mixture is a maximum. Thus most of the fuel will be burned before being scavenged from the cylinder and optimum fuel economy will be achieved during cruising conditions. FIGURE 4 schematically illustrates the engine 9 with its piston 9a, crankshaft 9b, crankarm 9c, and connecting rod 9d at the top center position, and also at various angles of crankarm positions in phantom. The schematic ignition circuit is indicated generally by 9e cooperable with the distributor 14 and crankshaft 9b.

In operation of the structure describe thus far, during normal idling conditions, spring 32 will maintain valve 30 in its closed position in opposition to the vacuum induction force on diaphragm 28 caused by the low pressure downstream of throttle valve 13. Thus the pressure in chamber 36, after equilibrium is established through restricted port 44, will be substantially atmospheric and will cooperate with spring 19 to urge the distributor 14 to its most retarded position, thereby to cause engine firing between 5° to 15° of crankshaft rotation beyond the top center position of the engine piston involved. During engine coasting or deceleration at slow speeds, the governor mechanism 14a will have no appreciable effect. As the coasting speed increases, the vacuum downstream of throttle valve 13 will gradually increase and also the governor mechanism will be increasingly effective to reduce the spark retardation. At a predetermined vacuum, as for example 20 inches of mercury which corresponds approximately to a coasting speed of 30 miles per hour, the low pressure at port 39 transmitted to chamber 27 will cause rightward shifting of diaphragm 28 and opening of valve 30 against the tension of spring 32.

It is to be noted that immediately upon opening of valve 30, the comparatively high pressure in chamber 36, acting on disk valve 30 to urge the latter closed, is dissipated through port 37 and conduit 38. In consequence, valve 30 operates somewhat as a poppet valve, such that after its initial opening, valve 30 will rapidly move to its fully open position. Small variations in manifold pressure will not cause it to close again until the coasting speed decreases to approximately 20 miles per hour. When valve 30 is open, the low pressure in chamber 36 will be transmitted via conduit 42 to chamber 16 to cause leftward movement of diaphragm 17 against the tension of spring 19, thereby in cooperation with the governor mechanism 14a to advance the distributor 14 to cause firing at approximately 35° of crankshaft rotation before the aforesaid top center position, i.e. at approximately the same angular position of the crankshaft 9b as would result during conventional cruising. Thus optimum combustion will occur during a period of maximum density of the fuel-air mixture, with a minimum discharge of unburned hydrocarbons to the atmosphere.

Also when valve 30 is open, air will be bled into induction conduit 11 downstream of throttle valve 13 via bleed port 44 and conduits 42a, 42, 37 and 38 to effect a slight dilution of the fuel-air mixture to the stoichiometric value or even lower as is frequently desirable in accordance with operating conditions.

Where is it undesirable to dilute the fuel-air mixture during high speed coasting, the structure is modified as illustrated in FIGURE 3 wherein most of the parts are the same in structure and operation as described above and are correspondingly numbered.

A significant difference in FIGURE 3 is that the tapered fitting 43 is replaced by a similar fitting 43a having an inwardly directed annular valve seat 43b adapted to be engaged by valve disk 30 when the latter is in its open position. Also, instead of being connected with chamber 16, fitting 43a is connected via conduit 42b with bleed port 44. Conduit 42b opens coaxially into chamber 36 within the confines of valve seat 43b, so that its connection with chamber 36 is blocked when valve 30 is in its open or rightward position. In FIGURE 3, chamber 36 is connected via conduit 42c with chamber 16 to actuate diaphragm 17 in accordance with the pressure in chamber 36 as described above in regard to FIGURES 1 and 2.

In operation of the structure illustrated in FIGURE 3, during normal idling or coasting at speeds less than approximately 30 m.p.h., valve 30 will be held in its leftward or closed position by spring 32 as illustrated in FIGURE 2. At coasting speeds in excess of 30 m.p.h., the low pressure downstream of throttle valve 13 will cause leftward shifting of diaphragm 28 and opening of valve 30. Prior to the opening of valve 30 the pressure in chamber 36 communicated thereto through duct 42b and bleed port 44 is substantially atmospheric, as described above. Accordingly, after the initial opening of valve 30, the pressure in chamber 36 is dissipated as described above to cause the poppet action of valve 30, whereby the latter rapidly opens fully and seats firmly at annular valve seat 43b, thereby to close the connection between chamber 36 and conduit 11 until the coasting speed slows to approximately 20 m.p.h. In consequence, when valve 30 is open, no bypass is provided around throttle valve 13 for diluting the fuel-air mixture. However, upon opening of valve 30, the low pressure in chamber 36 is communicated via conduit 42c to chamber 16 to move diaphragm 17 leftward and advance the ignition spark controlled by distributor 14 as described above.

I claim:

1. In combination, a carburetor for an internal combustion engine, an air intake induction conduit for said carburetor, a throttle valve movable in said conduit between idle and load positions, an ignition distributor, a pressure actuated distributor advance and retard means for retarding said distributor relative to its load setting when said engine is coasting at speeds up to approximately twenty miles per hour and said throttle valve is at said idle position, and said means being responsive only to pressures in said conduit downstream of said throttle valve at said idle position corresponding to engine coasting speeds greater than approximately twenty miles per hour for advancing said distributor.

2. In combination, a carburetor for an internal combustion engine, an air intake induction conduit for said carburetor, a throttle valve movable in said conduit between idle and load positions, an ignition distributor, a pressure actuated distributor advance and retard mechanism means for retarding said distributor relative to its load setting when said engine is coasting at speeds up to approximately twenty miles per hour and said throttle valve is at said idle position, and said means being responsive only to pressures in said conduit downstream of said throttle valve at said idle position corresponding to engine coasting speeds greater than approximately twenty miles per hour for advancing said distributor, said mechanism including pressure actuated means operable to advance said distributor by low pressure corresponding to the pressure in said conduit downstream of said throttle valve when the latter is in said idle position and said engine is coasting at approximately twenty miles per hour, and connecting means responsive only to pressures in said conduit downstream of said throttle valve at least as low as said low pressure for connecting said low pressure with said pressure actuated means to operate the latter to advance said distributor.

3. In the combination according to claim 2, said connecting means including a duct for connecting said pressure actuated means with said conduit downstream of said throttle valve, a pressure actuated valve in said duct for normally closing the communication between said pressure actuated means and conduit and responsive only to pressures at least as low as said low pressure for opening said communication, and a restricted bleed port connecting said duct at a location between said pressure actuated valve and pressure actuated means with a source of air upstream of said throttle valve.

4. In the combination according to claim 3, said pressure actuated valve including means for closing the connection between said bleed port and duct upon opening said communication between said pressure actuated means and conduit.

5. In combination, a carburetor for an internal combustion engine, an air intake induction conduit for said carburetor, a throttle valve movable in said conduit between idle and load positions, said carburetor including means for supplying to said conduit approximately a stoichiometric fuel-air mixture containing sufficient fuel to support efficient combustion in said engine when said throttle valve is at said idle position and said engine is coasting at a speed corresponding to a pressure in said conduit at a location downstream of said throttle valve less than a pressure of approximately twenty-two inches of mercury below atmospheric pressure, an ignition distributor, a pressure actuated distributor advance and retard means for retarding said distributor relative to its setting when said throttle valve is at said idle position and said engine is coasting at all speeds corresponding to pressure at said location higher than a predetermined low pressure of approximately twenty inches of mercury below atmospheric pressure, and said means being responsive only to pressures at said locations less than said predetermined low pressure for advancing said distributor.

6. In combination, a carburetor for an internal combustion engine, an air intake induction conduit for said carburetor, a throttle valve movable in said conduit between idle and load positions, said carburetor including means for supplying to said conduit approximately a stoichimetric fuel-air mixture containing sufficient fuel to support efficient combustion in said engine when said throttle valve is at said idle position and said engine is coasting at a speed corresponding to a pressure in said conduit at a location downstream of said throttle valve less than approximately twenty-two inches of mercury below atmospheric pressure, an ignition distributor, a pressure actuated distributor advance and retard means for retarding said distributor relative to its load setting when said throttle valve is at said idle position and said engine is coasting at all speeds corresponding to pressures at said location higher than a predetermined low pressure of approximately twenty inches of mercury below atmospheric pressure, and said means being responsive only to pressures at said locations less than than said predetermined low pressure advancing said distributor, said means including pressure actuated means operable to advance said distributor in response to said predetermined low pressure, and connecting means responsive only to pressures at said location at least as low as said predetermined low pressure for connecting said low pressure with said pressure actuated means to operate the same to advance said distributor.

7. In the combination according to claim 6, said connecting means including a duct for connecting said pressure actuated means with said conduit downstream of said throttle valve, a pressure actuated valve in said duct for normally closing the communication between said pressure actuated means and conduit and responsive only to pressures at least as low as said predetermined low pressure for opening said communication, and a restricted bleed port connecting said duct at a location between said pressure actuated valve and pressure actuated means with a source of air upstream of said throttle valve.

8. In the combination according to claim 7, said pressure actuated valve including means for closing the connection between said bleed port and duct upon opening said communication between said pressure actuated means and conduit.

9. In combination, a carburetor for an automobile engine, an air intake induction conduit for said carburetor, a throttle valve in said conduit movable between idle and load positions, a valve housing, valve means in said housing shiftable to a closed position to partition said housing into two chambers and shiftable to an open position to establish communication between said chambers, one of said chambers being in communication with the pressure in said conduit downstream of said throttle valve in its idle position, a pressure actuated distributor advance and retard means in communication with the other of said chambers and shiftable in a distributor advance direction relative to its idle setting in response to low pressure, means for communicating pressure in said conduit downstream of said throttle valve in the idle position to said pressure actuated distributor advance and retard means to shift the latter in said distributor advance direction when said pressure is lower than a predetermined low pressure less than the pressure existing in said conduit downstream of said throttle valve during engine idling comprising pressure actuated means responsive only to pressures lower than said predetermined low pressure in said one chamber for shifting said valve means to its open position, and means yieldingly urging said valve means to its closed position.

10. In the combination according to claim 9, a restricted bleed port connecting said other chamber with a source of air pressure equal to the air pressure at a location upstream of said throttle valve in its idle position.

11. In the combination according to claim 10, said valve means having means cooperable with said bleed port to close the same upon shifting of said valve means to its open position.

12. In the combination according to claim 10, said valve means including a reciprocable valve member and a pair of annular valve seats, one annular valve seat extending around an opening establishing the sole communication between said two chambers, the other annular valve seat extending around an opening establishing the sole communication between said other chamber and said bleed port, said valve member being in seated engagement with said one or other valve seat respectively to close the associated opening upon being shifted to its closed or open position respectively.

13. In combination, a carburetor for an internal combustion engine, an air intake induction conduit for said carburetor, a throttle valve movable in said conduit between idle and load positions, an ignition distributor, a pressure actuated distributor advance and retard means for retarding said distributor relative to its load setting when said engine is coasting at speeds up to a predetermined speed greater than engine idling and said throttle valve is at said idle position, and said means being responsive only to pressures in said conduit downstream of said throttle valve at said idle position corresponding to engine coasting speeds greater than said predetermined speed for advancing said distributor.

References Cited by the Examiner
UNITED STATES PATENTS

| | | | |
|---|---|---|---|
| 1,886,566 | 11/1932 | Mallory | 123—117 |
| 2,029,874 | 2/1936 | Kimball | 123—117 |
| 2,087,339 | 7/1937 | Arthur | 123—117.1 |
| 2,128,363 | 8/1938 | Jennings | 123—117.1 |
| 2,183,747 | 12/1939 | Jennings | 123—117.1 |

MARK NEWMAN, *Primary Examiner.*

FRED E. ENGELTHALER, *Examiner.*

A. L. SMITH, *Assistant Examiner.*